United States Patent
Nomura

(10) Patent No.: US 9,174,492 B2
(45) Date of Patent: Nov. 3, 2015

(54) PNEUMATIC TIRE

(75) Inventor: Seiji Nomura, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 577 days.

(21) Appl. No.: 13/306,013

(22) Filed: Nov. 29, 2011

(65) Prior Publication Data

US 2012/0132334 A1    May 31, 2012

(30) Foreign Application Priority Data

Nov. 30, 2010   (JP) ................................. 2010-267115

(51) Int. Cl.
*B60C 11/03*       (2006.01)

(52) U.S. Cl.
CPC ........... *B60C 11/0304* (2013.04); *B60C 11/033* (2013.04); *B60C 11/0318* (2013.04); *B60C 2011/0341* (2013.04); *B60C 2011/0353* (2013.04); *B60C 2011/0365* (2013.04); *B60C 2011/0372* (2013.04); *B60C 2011/0374* (2013.04)

(58) Field of Classification Search
CPC .............. B60C 11/0304; B60C 11/033; B60C 2011/0372; B60C 2011/0374; B60C 2011/0353; B60C 11/0318; B60C 2011/0365; B60C 2011/0341
USPC .......................................... 152/209.9, 209.8

IPC ....................................................... B60C 11/03
See application file for complete search history.

(56) References Cited

U.S. PATENT DOCUMENTS

| | | | |
|---|---|---|---|
| 2004/0134582 A1 | 7/2004 | Murata | |
| 2006/0266455 A1* | 11/2006 | Nagai | 152/209.8 |
| 2007/0089821 A1* | 4/2007 | Kishizoe | 152/209.2 |
| 2008/0000564 A1* | 1/2008 | Mukai | 152/209.8 |
| 2009/0095391 A1* | 4/2009 | Kojima | 152/209.8 |
| 2009/0178745 A1* | 7/2009 | Ikegami | 152/209.8 |
| 2010/0326577 A1* | 12/2010 | Iwai | 152/209.24 |

FOREIGN PATENT DOCUMENTS

| | | | | |
|---|---|---|---|---|
| EP | 2202098 A1 * | 6/2010 | ............. | B60C 11/12 |
| JP | 2009067244 A * | 4/2009 | ............. | B60C 11/11 |

* cited by examiner

*Primary Examiner* — Richard Crispino
*Assistant Examiner* — Philip N Schwartz
(74) *Attorney, Agent, or Firm* — Birch Stewart Kolasch & Birch, LLP

(57) ABSTRACT

A pneumatic tire is provided with an asymmetric tread pattern which comprises an inboard shoulder longitudinal groove (3A) at an axial distance Xi from the tire equator (C) and an outboard shoulder longitudinal groove (3B) at an axial distance Xo from the tire equator (C). The distances Xi and Xo are 27 to 33% of the tread width (TW), and the axial distance Xi is less than the axial distance Xo. A tread crown region between the inboard edge (3Ao) of the inboard shoulder longitudinal groove (3A) and the outboard edge (3Bo) of the outboard shoulder longitudinal groove (3B) has a sea ratio of 30 to 50%.

7 Claims, 4 Drawing Sheets

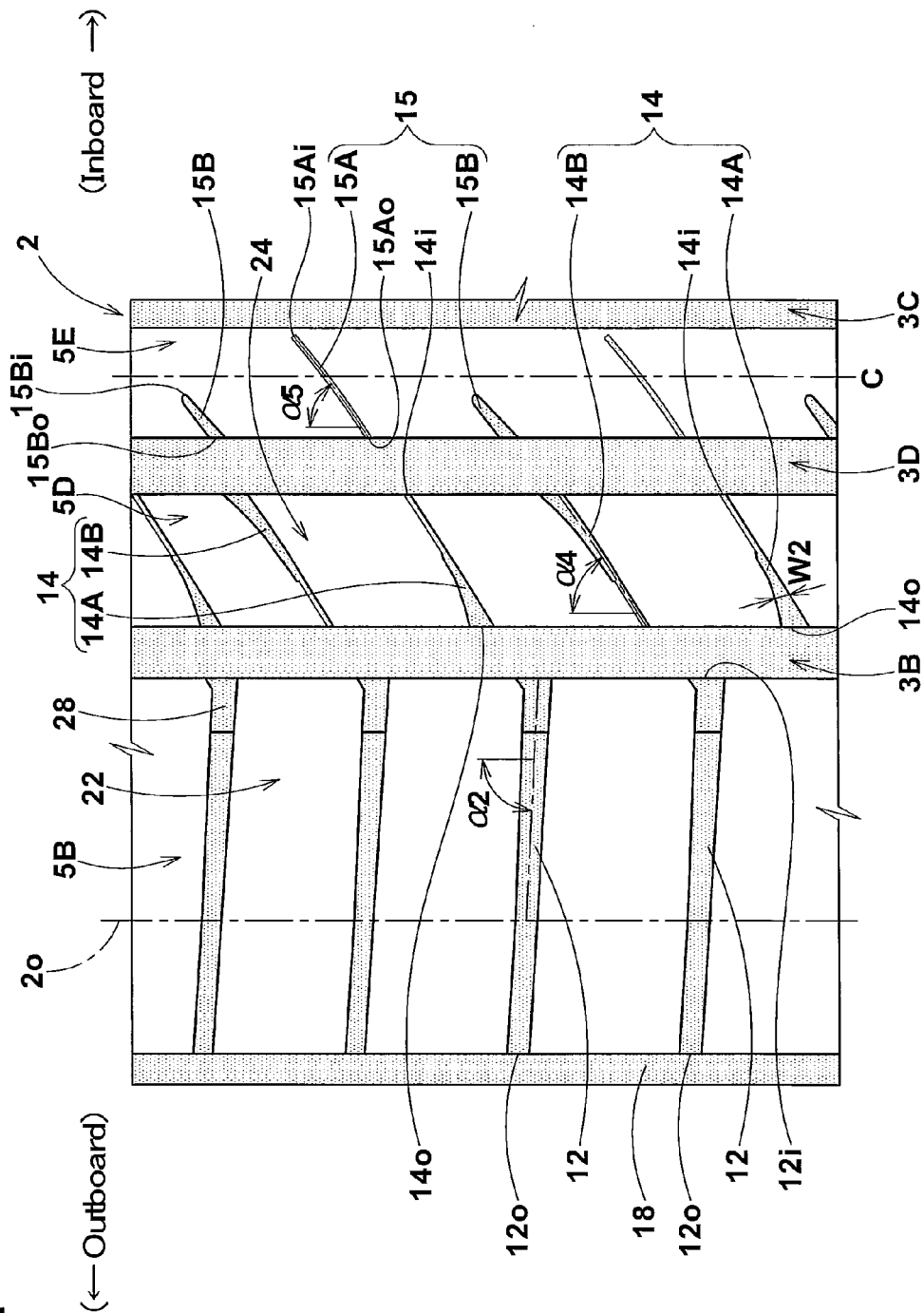

PNEUMATIC TIRE

BACKGROUND OF THE INVENTION

The present invention relates to a pneumatic tire, more particularly to an asymmetric tread pattern for passenger cars and the like capable of improving the drainage performance without sacrificing the steering stability on dry roads.

In general, in order to improve drainage performance of a pneumatic tire, the tread portion is provided with circumferentially-continuously-extending longitudinal grooves, and the longitudinal grooves are increased in the cross-sectional area and/or volume. However, if the groove volume/area is excessively increased, there is a tendency that the road grip performance during cornering is decreased and the steering stability on dry roads is liable to deteriorate.

By narrowing the tread width, the drainage performance may be improved, but deterioration of the steering stability on dry roads is inevitable.

SUMMARY OF THE INVENTION

It is therefore, an object of the present invention to provide a pneumatic tire of which drainage performance is improved without sacrificing the steering stability on dry roads.

According to the present invention, a pneumatic tire comprises a tread portion provided with a tread pattern asymmetric about the tire equator and having an inboard tread edge and an outboard tread edge to be positioned inside and outside, respectively, of a vehicle, the tread portion provided with circumferentially-continuously-extending longitudinal grooves including an inboard shoulder longitudinal groove as nearest to the inboard tread edge and an outboard shoulder longitudinal groove as nearest to the outboard tread edge, wherein the axial distance Xi from the tire equator to the inboard edge of the inboard shoulder longitudinal groove is in a range of from 27 to 33% of the tread width between the inboard tread edge and outboard tread edge, the axial distance Xo from the tire equator to the outboard edge of the outboard shoulder longitudinal groove is in a range of from 27 to 33% of the tread width, the axial distance Xi is less than the axial distance Xo, and a crown region defined between the inboard edge of the inboard shoulder longitudinal groove and the outboard edge of the outboard shoulder longitudinal groove has a sea ratio in a range of from 30 to 50%.

The terms "inboard" and "outboard" mean as being relatively close to the center of the vehicle and far from the center of the vehicle, respectively, on the assumption than the tire is properly installed on the vehicle. In the case of the tire alone, the terms "inboard" and "outboard" are interpreted as being relatively close to the inboard tread edge and close to the outboard tread edge, respectively.

In the pneumatic tire according to the present invention, therefore, the inboard shoulder longitudinal groove and outboard shoulder longitudinal groove get closer to a tread center region contacting with the ground during straight running, and further the sea ratio of the crown region is high.
As a result, water film existing between the tread face and the road surface is effectively removed by the longitudinal grooves, and the drainage performance can be greatly improved.
Further, as the inboard and outboard shoulder longitudinal grooves shift toward the tire equator, the rigidity of the tread portion is increased in the tread shoulder, and thereby road grip during cornering can be effectively improved, and the steering stability on dry roads is improved.

Furthermore, as the axial distance Xi is less than the axial distance Xo, the inboard shoulder land region which contacts with the ground during straight running when the tire is used with a negative camber angle, is increased in the rigidity, and the straight running stability on dry roads can be greatly improved.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflate to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

BRIEF DESCRIPTION OF THE DRAWINGS

FIG. 4 shows about another one half of FIG. 1 on the outboard tread edge side.

DESCRIPTION OF THE PREFERRED EMBODIMENTS

Embodiments of the present invention will now be described in detail in conjunction with the accompanying drawings.

The pneumatic tire 1 according to the present invention comprises a tread portion 2, a pair of sidewall portions, a pair of bead portions, a carcass extending between the bead portions, and a tread reinforcing belt disposed radially outside the carcass in the tread portion as usual.

In this embodiment, the pneumatic tire 1 is a summer tire for passenger cars.

Figure 1:
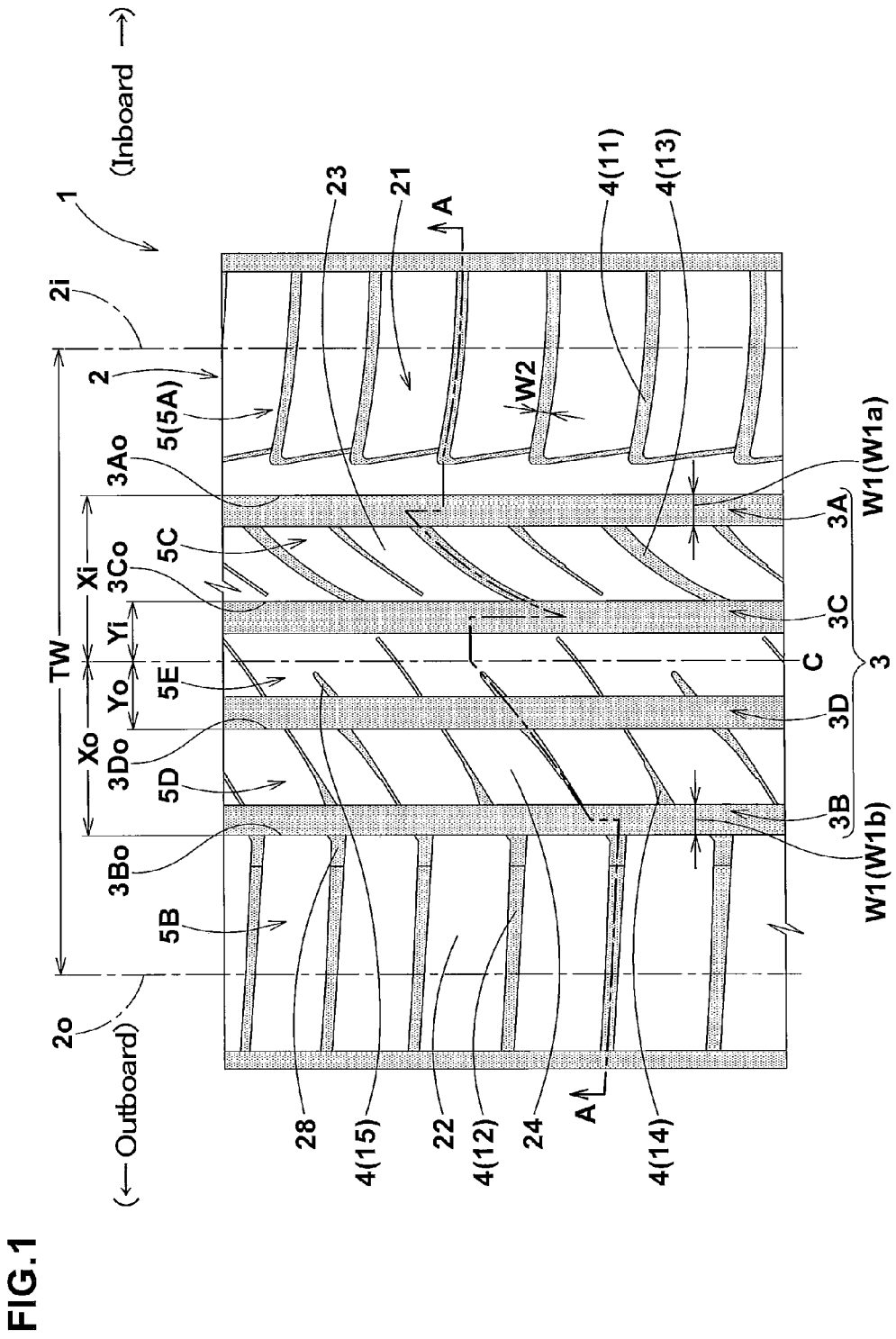
FIG. 1 is a developed view of a part of the tread portion of a pneumatic tire according to an embodiment of the present invention.
Figure 2:
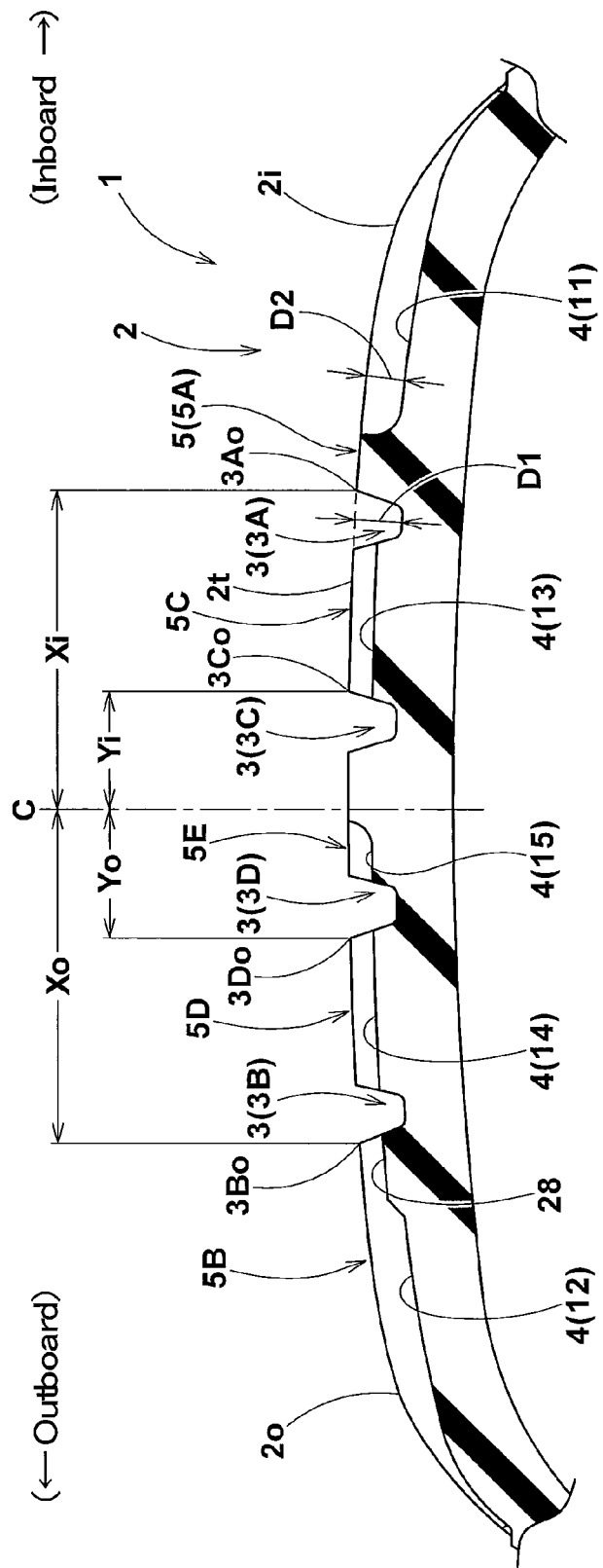
FIG. 2 is a cross sectional view of the tread portion of the tire taken along line A-A of FIG. 1.

As shown in FIG. 1 and FIG. 2, the tread portion 2 is provided with longitudinal grooves 3 extending continuously in the tire circumferential direction, and transverse grooves 4 extending crosswise to the longitudinal grooves 3 so as to form a tread pattern which is left-right asymmetry about the tire equator c.

Thus, the tire has an intended/designed mount position relative to the vehicle, namely, it is specified that which sidewall portion is to be positioned outside. Incidentally, the intended mount position is indicated in the sidewall portion by the use of words (for example "INSIDE" and/or "OUTSIDE") and/or symbol such as arrow.

The tire therefore has an inboard tread edge 2i to be positioned inside and an outboard tread edge 2o to be positioned outside in relation to the vehicle.

The undermentioned tread width TW is the axial distance measured between the tread edges 2i and 2o under the normally inflated unloaded condition.

The longitudinal grooves 3 are at least two grooves each extending straight in the tire circumferential direction and having a width W1 which is preferably set in a range of about 3 to 7% of the tread width TW, and a depth D1 which is preferably set in a range of about 3 to 6% of the tread width TW.

Such straight grooves are preferable because they can provide good drainage during straight running and during cornering.

The longitudinal grooves 3 include: an inboard shoulder longitudinal groove 3A as nearest to the inboard tread edge 2i; and an outboard shoulder longitudinal groove 3B as nearest to the outboard tread edge 2o.

In this embodiment, the longitudinal grooves 3 further include: an inboard central longitudinal groove 3C disposed between the inboard shoulder longitudinal groove 3A and the tire equator c; and an outboard center longitudinal groove 3D disposed between the outboard shoulder longitudinal groove 3B and the tire equator C.

By these longitudinal grooves 3A, 3B, 3C and 3D, the tread portion 2 is divided into: an inboard shoulder land region 5A defined by the inboard shoulder longitudinal groove 3A and the inboard tread edge 2i; an outboard shoulder land region 5B defined by the outboard shoulder longitudinal groove 3B and the outboard tread edge 2o; an inboard middle land region 5C defined by the inboard shoulder longitudinal groove 3A and the inboard central longitudinal groove 3C; an outboard middle land region 5D defined by the outboard shoulder longitudinal groove 3B and the outboard center longitudinal groove 3D; and a central land region 5E defined by the inboard central longitudinal groove 3C and the outboard center longitudinal groove 3D.

The crown region defined between the inboard edge 3Ao of the inboard shoulder longitudinal groove 3A and the outboard edge 3Bo of the outboard shoulder longitudinal groove 3B has a sea ratio in a range of from 30 to 50%.

Here, the sea ratio means the ratio SG/SL of the total grooved area SG to the gross area SL of the region concerned measured at the tread surface.

As shown in FIG. 1, the axial distance Xi from the tire equator C to the inboard edge 3Ao of the inboard shoulder longitudinal groove 3A is set in a range of from 27 to 33% of the tread width TW, and
the axial distance Xo from the tire equator C to the outboard edge 3Bo of the outboard shoulder longitudinal groove 3B is set in a range of from 27 to 33% of the tread width TW.

As a result, in comparison with the conventional tire, the inboard shoulder longitudinal groove 3A and outboard shoulder longitudinal groove 3B shift toward a tread center region which contacts with the ground during straight running as well as during cornering. Further, the sea ratio of the crown region therebetween is increased. Therefore, water film existing beneath the tread central region can be effectively discharged.

As the inboard shoulder longitudinal groove 3A and outboard shoulder longitudinal groove 3B shift toward the tire equator C, the inboard and outboard shoulder land regions 5A and 5B outside the grooves 3A and 3B, respectively, become wider. Therefore, the rigidity of the tread portion 2 is increased in the tread shoulder which contacts with the ground during cornering. As a result, the road grip is effectively increased and the steering stability on dry roads can be improved.

The above-mentioned axial distance Xi is set to be less than the axial distance Xo in order to increase the rigidity of the inboard shoulder land region 5A which contacts with the ground during straight running when the tire is installed on a vehicle with a negative camber angle, and thereby to improve the straight running stability on dry roads.

If the axial distances Xi and Xo are less than 27% of the tread width TW, the rigidity in the inboard shoulder land region 5A and outboard shoulder land region 5B is increased and the difference from the rigidity in the crown region is also increased. As a result, there is a possibility that the steering stability is deteriorated. If the axial distances Xi and Xo are more than 33% of the tread width TW, it is difficult to obtain the above-mentioned advantage.

From this standpoint, the axial distance Xi and distance Xo are preferably set in a range of not less than 28%, but not more than 32% of the tread width TW.

Preferably, the axial distance Xi is not more than 98%, more preferably not more than 97%, but, not less than 92%, more preferably not less than 93% of the distance Xo.

If more than 98%, it become difficult to obtain the above-mentioned advantage. If less than 92%, the rigidity of the inboard shoulder land region 5A is increased, and the rigidity difference between the inboard shoulder land region 5A and outboard shoulder land region 5B increases. As a result, there is a possibility that steering stability on dry roads is deteriorated.

If the above-mentioned sea ratio of the crown region is less than 30%, the drainage during straight running is deteriorated. If the sea ratio of the crown region exceeds 50%, the rigidity is excessively decreased in the tread central region, and there is a possibility that straight running stability on dry roads is deteriorated. From this standpoint, the sea ratio is preferably not less than 35%, more preferably not less than 37%, but not more than 45%, more preferably not more than 43%.

Preferably, the width W1a of the inboard shoulder longitudinal groove 3A is set to be more than the width W1b of the outboard shoulder longitudinal groove 3B.

Such wider inboard shoulder longitudinal groove 3A can eliminate more water from the tread face near the inboard shoulder longitudinal groove 3A when the tire 1 is installed on a vehicle with a negative camber angle and runs straight during which the tread face near the inboard shoulder longitudinal groove 3A mainly contacts with the ground, or when the tire 1 becomes on a closer side to the turning center during cornering. Thus, it is possible to improve the drainage performance of the tire under such situation.

In order to derive this advantageous effect, the groove width W1a is preferably set to be not less than 101%, more preferably not less than 103% of the groove width W1b.

However, if the groove width W1a is excessively increased, the rigidity is excessively decreased in the vicinity of the inboard shoulder longitudinal groove 3A, and there is a possibility that the straight running stability on dry roads is deteriorated.

From this standpoint, the groove width W1a is preferably set to be not more than 120%, more preferably not more than 110% of the groove width W1b.

The axial distance Yi from the tire equator C to the inboard edge 3Co of the inboard central longitudinal groove 3C is set to be less than the axial distance Yo from the tire equator C to the outboard edge 3Do of the outboard center longitudinal groove 3D.

As a result, the rigidity of the inboard middle land region 5C is relatively increased, and the straight running stability on dry roads can be effectively improved when the camber angle is negative because the inboard middle land region 5C can more contact with the ground during straight running.

Preferably, the axial distance Yi is not more than 95%, more preferably not more than 90%, but not less than 80%, more preferably not less than 85% of the axial distance Yo.

If the axial distance Yi is more than 95%, it is difficult to derive the above explained advantageous effect. If the axial distance Yi is less than 80%, the rigidity difference between the inboard middle land region 5C and outboard middle land region 5D increases, and there is a possibility that the steering stability on dry roads is deteriorated.

The above-mentioned transverse grooves 4 are: inboard shoulder transverse grooves 11 disposed in the inboard shoulder land region 5A; outboard shoulder transverse grooves 12 disposed in the outboard shoulder land region 5B; inboard middle transverse grooves 13 disposed in the inboard middle land region 5C; outboard middle transverse grooves 14 disposed in the outboard middle land region 5D; and central transverse grooves 15 disposed in the central land region 5E. Preferably, these transverse grooves 11-15 each have a width W2 of about 2 to 3% of the tread width TW, and a depth D2 of about 5 to 8% of the tread width TW.

Figure 3:
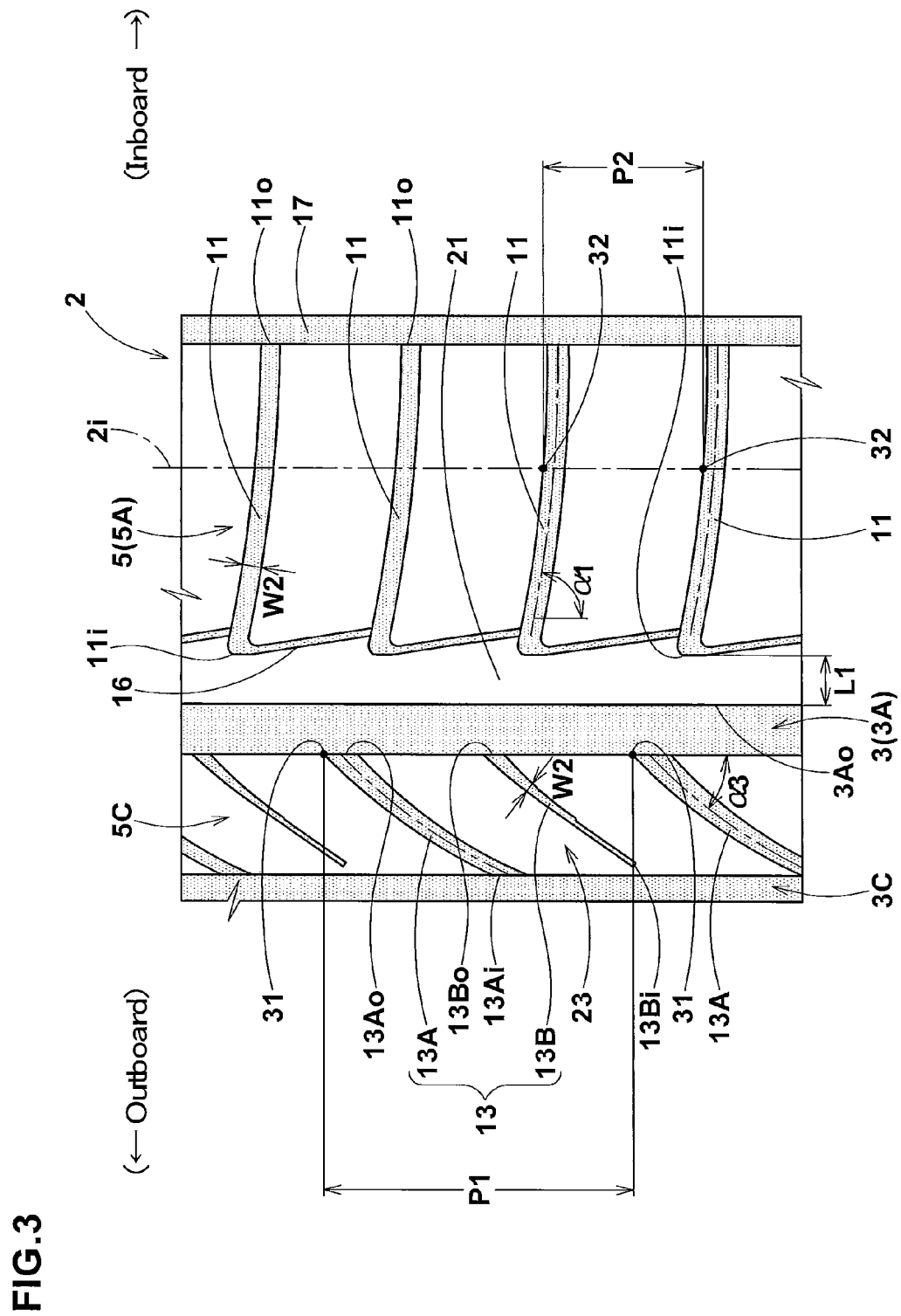
FIG. 3 shows about one half of FIG. 1 on the inboard tread edge side.

As shown in FIG. 3, the inboard shoulder transverse grooves 11 extend toward the tire equator from the outside of the inboard tread edge 2i, while slightly inclining to one circumferential direction and keeping a substantially constant groove width W2 to smoothly lead water to the inboard tread edge 2i.

The angle $\alpha 1$ of the inboard shoulder transverse grooves 11 with respect to the tire circumferential direction is preferably set in a range of not less than 75 degrees, more preferably not less than 80 degrees, but not more than 90 degrees.

If the angle $\alpha 1$ is less than 75 degrees, the smooth leading of water utilizing the rolling of the tire becomes difficult. If the angle $\alpha 1$ is more than 90 degrees, the rigidity in the inboard shoulder land region 5A decreases, and there is a possibility that the straight running stability on dry roads is deteriorated. In this embodiment, the outboard ends 11i of the inboard shoulder transverse grooves 11 terminate, without reaching to the inboard shoulder longitudinal groove 3A, whereby, in the inboard shoulder land region 5A, there is formed a circumferentially continuously extending rib 21 abutting on the inboard shoulder longitudinal groove 3A.

Thus, the rigidity in the inboard shoulder land region 5A is increased, and the straight running stability on dry roads can be greatly improved when the tire is used with a negative camber angle.

In order to effectively derive this advantage, the axial minimum distance L1 between the outboard ends 11i of the inboard shoulder transverse grooves 11 and the inboard edge 3Ao of the inboard shoulder longitudinal groove 3A is preferably set to be not less than 80%, more preferably not less than 90% of the width W1a of the inboard shoulder longitudinal groove 3A. However, if the axial minimum distance L1 is excessively increased, there is a possibility that the drainage is deteriorated. From this standpoint, the axial minimum distance L1 is preferably not more than 120%, more preferably not more than 110% of the groove width W1a.

In the inboard shoulder land region 5A, there are disposed inner shoulder narrow grooves 16 each extending from one of the outboard ends 11i of the inboard shoulder transverse grooves 11 to the circumferentially adjacent inboard shoulder transverse groove 11, while inclining toward the inboard tread edge 2i at a small angle with respect to the tire circumferential direction.

Such inner shoulder narrow grooves 16 can provide a zigzag edge having a saw-tooth appearance for the rib 21, and the zigzag edge can break water film. As a result, the drainage performance can be improved.

Further, outside the inboard shoulder land region 5A, there is provided with an inboard shoulder link groove 17 which circumferentially connects the inboard ends 11o of the circumferentially adjacent inboard shoulder transverse grooves 11. The inboard shoulder link groove 17 can mitigate distortion occurring in the inboard shoulder land region 5A, and helps to control the occurrence of uneven wear.

As shown in FIG. 4, the outboard shoulder transverse grooves 12 extend from the outboard shoulder longitudinal groove 3B toward the outboard tread edge 2o, while slightly inclining to one circumferential direction. The inboard ends 12i of the outboard shoulder transverse grooves 12 are opened to the outboard shoulder longitudinal groove 3B. The outboard shoulder transverse grooves 12 extend beyond the outboard tread edge 2o and then terminate. Accordingly, the outboard ends 12o thereof are positioned outside the outboard tread edge 2o. Thus, water film existing beneath the outboard shoulder land region 5B and water existing in the outboard shoulder longitudinal groove 3B can be effectively led to the outboard tread edge 2i and discharged.

The angle $\alpha 2$ of the outboard shoulder transverse grooves 12 with respect to the tire circumferential direction is preferably set in a range of not less than 80 degrees, but not more than 90 degrees for the similar view to the angle $\alpha 1$.

Further, on the outside of the outboard shoulder land region 5B, there is provided with an outer shoulder link groove 18 circumferentially connecting the outboard ends 12o of the outboard shoulder transverse grooves 12.

Similar to the inboard shoulder link groove 17, the outer shoulder link groove 18 can mitigate distortion occurring in the outboard shoulder land region 5, and helps to control the occurrence of uneven wear.

By the outboard shoulder transverse grooves 12, the outboard shoulder land region 5B is divided into outer shoulder blocks 22 having rectangular configurations longer in the tire axial direction than in the tire circumferential direction in order to increase the axial rigidity and thereby to improve the steering stability on dry roads.

Preferably, the outboard shoulder transverse groove 12 is partially provided near the outboard shoulder longitudinal groove 3B with a tie bar 28 protruding from the groove bottom within the groove so as to extend from one of opposite groove walls to the other in order to increase the tread rigidity in the outboard shoulder land region 5B and thereby further improve the steering stability on dry roads.

As shown in FIG. 3, the inboard middle transverse grooves 13 are disposed between the inboard shoulder longitudinal groove 3A and the inboard central longitudinal groove 3C, and are inclined steeply when compare with the inboard shoulder transverse grooves 11.

The angle α3 of the inboard middle transverse grooves 13 with respect to the tire circumferential direction is preferably set in a range of not less than 25 degrees, more preferably not less than 30 degrees, but not more than 50 degrees, more preferably not more than 45 degrees in order to improve the rigidity and drainage in the inboard middle land region 5C in a well balanced manner.

In this embodiment, the width W2 of the inboard middle transverse grooves 13 gradually increases from the inboard central longitudinal groove 3C to the inboard shoulder longitudinal groove 3A. Thus, water film existing beneath the inboard middle land region 5C which contacts with the ground during straight running and during cornering can be smoothly led by the inboard middle transverse grooves 13 and the drainage performance can be improved.

In this embodiment, the inboard middle transverse grooves 13 include: first inboard middle transverse grooves 13A; and second inboard middle transverse grooves 13B which are arranged alternately in the tire circumferential direction. The first inboard middle transverse groove 13A has an inboard end 13Ao opened to the inboard shoulder longitudinal groove 3A and an outboard end 13Ai opened to the inboard central longitudinal groove 3C.

The second inboard middle transverse grooves 13B has an inboard end 13Bo opened to the inboard shoulder longitudinal groove 3A and an outboard end 13Bi terminated without reaching to the inboard central longitudinal groove 3C.

By the first inboard middle transverse grooves 13A, the inboard middle land region 5C is divided into inboard middle blocks 23 having a parallelogram configuration longer in the tire circumferential direction than in the tire axial direction. By arranging the first and the second inboard middle transverse grooves 13A and 13B and the inboard middle blocks 23 as described above, the drainage can be increased, while controlling the excessively decrease in the rigidity of the inboard middle land region 5C.

It is preferable that, as shown in FIG. 3, the circumferential pitch P1 of the first inboard middle transverse grooves 13A is more than the circumferential pitch P2 of the inboard shoulder transverse grooves 11.

Here, the circumferential pitch P1 can be defined as the circumferential distance between the intersecting points 31 of the inboard shoulder longitudinal groove 3A with the groove edges of the first inboard middle transverse grooves 13A on one side in the tire circumferential direction.

The circumferential pitch P2 can be defined as the circumferential distance between the intersecting points 32 of the inboard tread edge 2i with the groove edges of the inboard shoulder transverse grooves 11 on one side in the tire circumferential direction.

Therefore, the drainage can be increased by the first inboard middle transverse grooves 13A, while controlling decrease in the tread rigidity in the inboard middle land region 5C.

In order to effectively derive this advantage, the circumferential pitch P1 is preferably set to be not less than 150%, more preferably not less than 170% of the circumferential pitch P2. However, if the circumferential pitch P1 is excessively increased, as the number of the first inboard middle transverse grooves 13A decreases, there is a possibility that the drainage is decreased. From this standpoint, the circumferential pitch P1 is preferably not more than 250%, more preferably not more than 220% of the circumferential pitch P2.

As shown in FIG. 4, the outboard middle transverse grooves 14 extend from the outboard shoulder longitudinal groove 3B to the outboard center longitudinal groove 3D, while inclining to one circumferential direction.

The outboard middle transverse groove 14 has an outboard end 14o opened to the outboard shoulder longitudinal groove 3B and an inboard end 14i opened to the outboard center longitudinal groove 3D.

The angle α4 of the outboard middle transverse grooves 14 with respect to the tire circumferential direction is set to be less than the angle α2 of the outboard shoulder transverse grooves 12 with respect to the tire circumferential direction. Preferably, the angle α4 is set in a range of about 40 to 70 degrees.

Such outboard middle transverse grooves 14 can lead water film existing beneath the outboard middle land region 5D to the outboard tread edge 2o effectively utilizing the rolling of the tire.

The outboard middle transverse grooves 14 include: first outboard middle transverse grooves 14A and second outboard middle transverse grooves 14B which are arranged alternately in the circumferential direction.

When viewed from the outboard shoulder longitudinal groove 3B towards the outboard center longitudinal groove 3D, the width w2 of the first outboard middle transverse groove 14A gradually decreases, but the width W2 of the second outboard middle transverse groove 14B gradually increases.

Such arrangement of the first and second outboard middle transverse grooves 14A and 14B can uniform the tread rigidity in the outboard middle land region 5D in the tire axial direction, while providing sufficient drainage. And the steering stability on dry roads can be further improved.

By the outboard middle transverse grooves 14, the outboard middle land region 5D is divided into outboard middle blocks 24 having a substantially parallelogram configuration in order to provide axial rigidity and circumferential rigidity in a well balance manner, which helps to improve the straight running stability on dry roads and steering stability.

The central transverse grooves 15 include first central transverse grooves 15A and second central transverse grooves 15B which are arranged alternately in the circumferential direction. The first central transverse groove 15A has an outboard end 15Ao opened to the outboard center longitudinal groove 3D and an inboard end 15Ai positioned between the tire equator C and the inboard central longitudinal groove 3C. The second central transverse groove 15B has an outboard end 15Bo opened to the outboard center longitudinal groove 3D and an inboard end 15Bi positioned between the outboard center longitudinal groove 3D and the tire equator C. The second central transverse groove 15B is wider than the first central transverse groove 15A. Thus, the central land region 5E is not provided with grooves extending across its entire width, therefore, the central land region 5E can function as an almost circumferentially continuously extending rib. The first and second central transverse grooves 15A and 15B prevent the rigidity of the central land region 5E from excessively decreasing, which helps to increase the drainage while maintaining the straight running stability and steering stability.

with respect to the tire circumferential direction, the angle α5 of the central transverse grooves 15 is less than the angle α2 of the outboard shoulder transverse grooves 12 and less than the angle α4 of the outboard middle transverse grooves 14. Preferably, the angle α5 is set in a range of from about 25 to 60 degrees. Such central transverse grooves 15 can effectively lead water film existing beneath the central land region 5E to the outboard tread edge 2o by utilizing the rolling of the tire.

The first central transverse grooves 15A are respectively aligned with the first outboard middle transverse grooves 14A. The second central transverse grooves 15B are respectively aligned with the second outboard middle transverse grooves 14B.

Comparison Tests

Based on the tread pattern shown in FIG. 1, test tires of size 245/50 R18 (rim size 18×8J) having longitudinal grooves and transverse grooves shown in Table 1 were prepared and tested.
Common specifications are as follows.
tread width TW: 183 mm
longitudinal grooves:
groove depth D1: 8 mm (4.1% of TW)
transverse grooves:
width W2: 3 to 5 mm (1.6 to 2.7% of TW)
depth D2: 5 to 7 mm (2.7 to 3.8% of TW)
inboard shoulder transverse grooves:
angle α1: 80 degrees
distance L1: 10 mm
pitch P2: 33 mm
outboard shoulder transverse grooves:
angle α2: 85 degrees
inboard middle transverse grooves:
angle α3: 35 degrees
pitch P1: 66 mm
outboard middle transverse grooves:
angle α4: 65 degrees
central transverse grooves:
angle α5: 50 degrees
Test car: 3000 cc FR passenger car provided on four wheels with test tires
camber: negative camber of 1 degree
tire pressure: 230 kPa
<Drainage Test>
using the above-mentioned test car on a wet asphalt road covered with 5 mm depth water, full brake was applied under such conditions that ABS was turned on, and the running speed was 60 km, and the road grip during braking was evaluated into ten ranks by the test driver, wherein the higher the rank number, the better the drainage. The results are indicated in Table 1.
<Steering Stability Test on Dry Roads>
The test car was run on a dry asphalt road in a tire test course, and the test driver evaluated the steering stability into ranks based on the steering response, rigidity and grip during cornering, wherein the higher the rank number, the better the steering stability on dry roads. The results are indicated in Table 1.

From the test results, it was confirmed that the tire according to the present invention can be improved in the drainage while maintaining the steering stability on dry roads.

TABLE 1

| Tire | Ref. 1 | Ref. 2 | Ref. 3 | Ref. 4 | Ex. 1 | Ex. 2 | Ex. 3 | Ex. 4 | Ex. 5 | Ex. 6 | Ex. 7 |
|---|---|---|---|---|---|---|---|---|---|---|---|
| sea ratio (%) of crown region | 40 | 40 | 25 | 55 | 40 | 30 | 50 | 40 | 40 | 40 | 40 |
| inboard shoulder longitudinal groove | | | | | | | | | | | |
| width W1a (mm) | 10.3 | 10.3 | 8.3 | 12.3 | 10.3 | 9.3 | 11.6 | 9.9 | 11.8 | 10.3 | 10.3 |
| L1/W1a (%) | 97.1 | 97.1 | 120.5 | 81.3 | 97.1 | 107.5 | 86.2 | 101 | 84.7 | 97.1 | 97.1 |
| axial distance Xi(mm) | 60.4 | 42.1 | 54.7 | 54.7 | 54.7 | 54.7 | 54.7 | 54.7 | 54.7 | 54.7 | 54.7 |
| Xi/TW (%) | 33 | 23 | 29.9 | 29.9 | 29.9 | 29.9 | 29.9 | 29.9 | 29.9 | 29.9 | 29.9 |
| outboard shoulder longitudinal groove | | | | | | | | | | | |
| width W1b (mm) | 9.8 | 9.8 | 7.8 | 11.8 | 9.8 | 8.5 | 11.0 | 9.8 | 9.8 | 9.8 | 9.8 |
| axial distance Xo(mm) | 64.0 | 45.8 | 57.2 | 57.2 | 57.2 | 57.2 | 57.2 | 57.2 | 57.2 | 57.2 | 57.2 |
| Xo/TW (%) | 35 | 25 | 31.3 | 31.3 | 31.3 | 31.3 | 31.3 | 31.3 | 31.3 | 31.3 | 31.3 |
| Xi/Xo (%) | 74.4 | 91.9 | 95.6 | 95.6 | 95.6 | 95.6 | 95.6 | 95.6 | 95.6 | 95.6 | 95.6 |
| W1a/W1b (%) | 105 | 105 | 106 | 104 | 105 | 109 | 105 | 101 | 120 | 105 | 105 |
| inboard and outboard center longitudinal grooves | | | | | | | | | | | |
| width W1 (mm) | 10.7 | 10.7 | 8.7 | 12.5 | 10.7 | 9.5 | 12.0 | 10.7 | 10.7 | 10.7 | 10.7 |
| W1/TW (%) | 5.8 | 5.8 | 4.8 | 6.8 | 5.8 | 5.2 | 6.6 | 5.8 | 5.8 | 5.8 | 5.8 |
| axial distance Yi(mm) | 22.7 | 15.4 | 20.0 | 20.0 | 20.0 | 20.0 | 20.0 | 20.0 | 20.0 | 21.4 | 18.0 |
| axial distance Yo(mm) | 25.3 | 18.1 | 22.5 | 22.5 | 22.5 | 22.5 | 22.5 | 22.5 | 22.5 | 22.5 | 22.5 |
| Yi/Yo (%) | 89.7 | 85.1 | 88.9 | 88.9 | 88.9 | 88.9 | 88.9 | 88.9 | 88.9 | 95.1 | 80 |
| Test results | | | | | | | | | | | |
| drainage | 4 | 9 | 3 | 9 | 8 | 7 | 8 | 6 | 7 | 7 | 9 |
| steering stability | 8 | 4 | 8 | 3 | 8 | 8 | 7 | 8 | 7 | 7 | 6 |

The invention claimed is:

1. A pneumatic tire comprises a tread portion provided with a tread pattern asymmetric about the tire equator and having an inboard tread edge and an outboard tread edge to be positioned inside and outside, respectively, of a vehicle, wherein
said tread portion provided with circumferentially-continuously-extending longitudinal grooves each being a straight groove having a width W1 of from 3% to 7% of the tread width TW between the inboard tread edge and outboard tread edge, the longitudinal grooves including an inboard shoulder longitudinal groove as nearest to the inboard tread edge, an outboard shoulder longitudinal groove as nearest to the outboard tread edge, an inboard central longitudinal groove disposed between the tire equator and the inboard shoulder longitudinal groove, and an outboard center longitudinal groove disposed between the tire equator and the outboard shoulder longitudinal groove, wherein the axial distance Xi from the tire equator to the inboard edge of the inboard shoulder longitudinal groove is in a range of from 27 to 33% of the tread width (TW), the axial distance Xo from the tire equator to the outboard edge of the outboard shoulder longitudinal groove is in a range of from 27 to 33% of the tread width (TW), the axial distance Xi is less than the axial distance Xo, and the axial distance Yi from the tire equator to the inboard edge of the inboard central longitudinal groove is less than the axial distance Yo from the tire equator to the outboard edge of the outboard center longitudinal groove, an inboard shoulder land region of the tread portion, which is defined between the inboard shoulder longitudinal groove and the inboard tread edge, is provided with inboard shoulder transverse grooves extending at an angle of from 75 to 90 degrees with respect to the tire circumferential direction from outside of the inboard tread edge toward the inboard shoulder longitudinal groove but terminating without reaching thereto, an outboard shoulder land region of the tread portion, which is defined between the outboard shoulder longitudinal groove and the outboard tread edge, is provided with outboard shoulder transverse grooves extending at an angle of from 80 to 90 degrees with respect to the tire circumferential direction from the outboard shoulder longitudinal groove toward the outboard tread edge and terminating at a position beyond the outboard tread edge, an inboard middle land region of the tread portion, which is defined between the inboard central longitudinal groove and the inboard shoulder longitudinal groove, is provided with inboard middle transverse grooves extending at an angle of from 25 to 50 degrees with respect to the tire circumferential direction, wherein the inboard middle transverse grooves include: first inboard middle transverse grooves each having an inboard end opened to the inboard shoulder longitudinal groove, and an outboard end opened to the inboard central longitudinal groove; and second inboard middle transverse grooves having an inboard end opened to the inboard shoulder longitudinal groove and an outboard end terminated without reaching to the inboard central longitudinal groove, an outboard middle land region of the tread portion, which is defined between the outboard center longitudinal groove and the outboard shoulder longitudinal groove, is provided with outboard middle transverse grooves extending from the outboard shoulder longitudinal groove to the outboard center longitudinal groove, while inclining to one circumferential direction, to have an outboard end opened to the outboard shoulder longitudinal groove and an inboard end opened to the outboard center longitudinal groove, said inboard shoulder land region is provided with inboard shoulder narrow grooves each extending from one of the outboard ends of the inboard shoulder transverse grooves to the circumferentially adjacent inboard shoulder transverse groove, while inclining toward the inboard tread edge, a crown region defined between an inboard edge of the inboard shoulder longitudinal groove and an outboard edge of the outboard shoulder longitudinal groove has a sea ratio in a range of from 30 to 50%, and a central land region defined between the inboard central longitudinal groove and the outboard center longitudinal groove is provided with central transverse grooves each being an independent groove having an outboard end opened to the outboard center longitudinal groove and an inboard closed end, said central transverse grooves being narrower central transverse grooves and wider central transverse grooves arranged alternately in the tire circumferential direction, and the narrower central transverse grooves extend across the tire equator whereas the wider central transverse grooves end without reaching to the tire equator.

2. The pneumatic tire according to claim 1, wherein the width of the inboard shoulder longitudinal groove is more than the width of the outboard shoulder longitudinal groove.

3. The pneumatic tire according to claim 2, wherein the circumferential pitch (P1) of the first inboard middle transverse grooves is more than the circumferential pitch (P2) of the inboard shoulder transverse grooves.

4. A vehicle with the pneumatic tire according to claim 1, which is attached to the vehicle to have a negative camber angle.

5. The pneumatic tire according to claim 1, wherein the circumferential pitch (P1) of the first inboard middle transverse grooves is not less than 150% and not more than 250% of the circumferential pitch (P2) of the inboard shoulder transverse grooves.

6. The pneumatic tire according to claim 1, wherein the axial distance Xi is not more than 98% and not less than 92% of the axial distance Xo.

7. The pneumatic tire according to claim 1, wherein the axial distance Yi is not more than 95% and not less than 80% of the axial distance Yo.

* * * * *